United States Patent
Narayanan et al.

(10) Patent No.: US 10,448,314 B2
(45) Date of Patent: Oct. 15, 2019

(54) METHODS AND SYSTEMS FOR MITIGATING CONNECTION IMPACT ON NETWORK INFRASTRUCTURE

(71) Applicant: SYMBOL TECHNOLOGIES, LLC, Lincolnshire, IL (US)

(72) Inventors: Venkateswaran Narayanan, Bangalore (IN); Anandakumar Gopalsamy, Bangalore (IN); Ambika Nagarajaiah, Bangalore (IN); Dayal Madhukar Rai, Bangalore (IN); Sethuraman Vijayakumar, Maduri (IN); Sateesh V. Angadi, Bangalore (IN); David A. Meyer, East Meadow, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 12 days.

(21) Appl. No.: 15/834,975

(22) Filed: Dec. 7, 2017

(65) Prior Publication Data

US 2019/0182750 A1    Jun. 13, 2019

(51) Int. Cl.

| | |
|---|---|
| *H04W 48/06* | (2009.01) |
| *H04W 48/12* | (2009.01) |
| *H04W 48/16* | (2009.01) |
| *H04W 24/08* | (2009.01) |
| *H04W 76/30* | (2018.01) |
| *H04L 12/26* | (2006.01) |
| *H04W 28/08* | (2009.01) |

(52) U.S. Cl.
CPC ........... *H04W 48/06* (2013.01); *H04W 24/08* (2013.01); *H04W 48/12* (2013.01); *H04W 48/16* (2013.01); *H04W 76/30* (2018.02); *H04L 43/0876* (2013.01); *H04W 28/08* (2013.01)

(58) Field of Classification Search
CPC ... H04L 41/069; H04L 41/0893; H04L 41/12; H04W 24/00
See application file for complete search history.

(56) References Cited

U.S. PATENT DOCUMENTS

| | | | | |
|---|---|---|---|---|
| 7,801,095 | B2 * | 9/2010 | Kil ........................ | H04W 88/08 |
| | | | | 370/338 |
| 9,380,633 | B2 * | 6/2016 | Toner ..................... | H04W 24/08 |
| 9,596,585 | B2 * | 3/2017 | Abhishek .............. | H04W 8/005 |
| 9,858,739 | B1 * | 1/2018 | Johnson ................ | H04W 76/10 |
| 2004/0199668 | A1 * | 10/2004 | Lin ........................ | H04W 48/20 |
| | | | | 709/241 |

(Continued)

*Primary Examiner* — Melanie Jagannathan (57) ABSTRACT

A method in a client device of mitigating connection impact on network infrastructure includes: storing a record of network disconnection events; prior to initiating a network connection, determining whether the record of network disconnection events contains an indication of a local disconnection event; when the record of network disconnection events contains an indication of a local disconnection event, generating and transmitting a scanning request message containing a disconnect indicator; responsive to receiving a response to the scanning request message, determining whether a number of entries in the record of network disconnection events exceeds a threshold; when the number of entries in the record of network disconnection events exceeds the threshold, incrementing a connection interval according to a backoff interval; and sending a connection request message upon expiry of the connection interval.

24 Claims, 7 Drawing Sheets

(56) References Cited

U.S. PATENT DOCUMENTS

| | | | |
|---|---|---|---|
| 2004/0246922 A1* | 12/2004 | Ruan | H04W 48/20 370/331 |
| 2005/0265283 A1* | 12/2005 | Qi | H04W 36/22 370/331 |
| 2006/0233114 A1* | 10/2006 | Alam | H04L 41/069 370/252 |
| 2009/0147698 A1* | 6/2009 | Potvin | H04L 45/02 370/254 |
| 2010/0178872 A1* | 7/2010 | Alrabady | H04W 4/02 455/41.3 |
| 2011/0200025 A1* | 8/2011 | Goto | H04W 8/18 370/338 |
| 2013/0094386 A1* | 4/2013 | Kawamura | H04W 76/20 370/252 |
| 2015/0139010 A1* | 5/2015 | Jeong | H04W 48/14 370/252 |
| 2015/0173095 A1* | 6/2015 | Ansley | H04L 47/6275 370/336 |
| 2015/0257108 A1* | 9/2015 | Hara | H04W 48/16 370/311 |
| 2016/0295638 A1* | 10/2016 | Allanki | H04W 48/20 |
| 2016/0338128 A1* | 11/2016 | da Silva | H04W 8/20 |
| 2017/0005886 A1* | 1/2017 | Dade | H04L 43/065 |
| 2017/0346853 A1* | 11/2017 | Wyatt | H04L 43/12 |
| 2018/0102955 A1* | 4/2018 | Jones-McFadden | H04L 43/08 |
| 2018/0152960 A1* | 5/2018 | Kim | H04W 76/27 |
| 2018/0213574 A1* | 7/2018 | Bareket | H04L 43/0811 |
| 2018/0219879 A1* | 8/2018 | Pierce | H04L 63/1416 |

\* cited by examiner

METHODS AND SYSTEMS FOR MITIGATING CONNECTION IMPACT ON NETWORK INFRASTRUCTURE

BACKGROUND

In environments (e.g. warehouses) in which substantial numbers of wireless devices, such as handheld barcode scanners, are deployed, the devices are typically connected to a wireless network deployed within the warehouse. When the network suffers an outage (e.g. due to power loss within the warehouse), the wireless devices typically attempt to reconnect to the wireless network. Such reconnection attempts may have a negative impact on the wireless network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a client device of mitigating connection impact on network infrastructure, including: storing a record of network disconnection events; prior to initiating a network connection, determining whether the record of network disconnection events contains an indication of a local disconnection event; when the record of network disconnection events contains an indication of a local disconnection event, generating and transmitting a scanning request message containing a disconnect indicator; responsive to receiving a response to the scanning request message, determining whether a number of entries in the record of network disconnection events exceeds a threshold; when the number of entries in the record of network disconnection events exceeds the threshold, incrementing a connection interval according to a backoff interval; and sending a connection request message upon expiry of the connection interval.

Further examples disclosed herein are directed to a client device for mitigating connection impact on network infrastructure, comprising: a communications interface; a memory storing a record of network disconnection events; a processor interconnected with the memory and the communication interface, the processor configured to: prior to initiating a network connection, determine whether the record of network disconnection events contains an indication of a local disconnection event; when the record of network disconnection events contains an indication of a local disconnection event, generate and transmit a scanning request message containing a disconnect indicator; responsive to receiving a response to the scanning request message, determine whether a number of entries in the record of network disconnection events exceeds a threshold; when the number of entries in the record of network disconnection events exceeds the threshold, increment a connection interval according to a backoff interval; and send a connection request message upon expiry of the connection interval.

Figure 1:
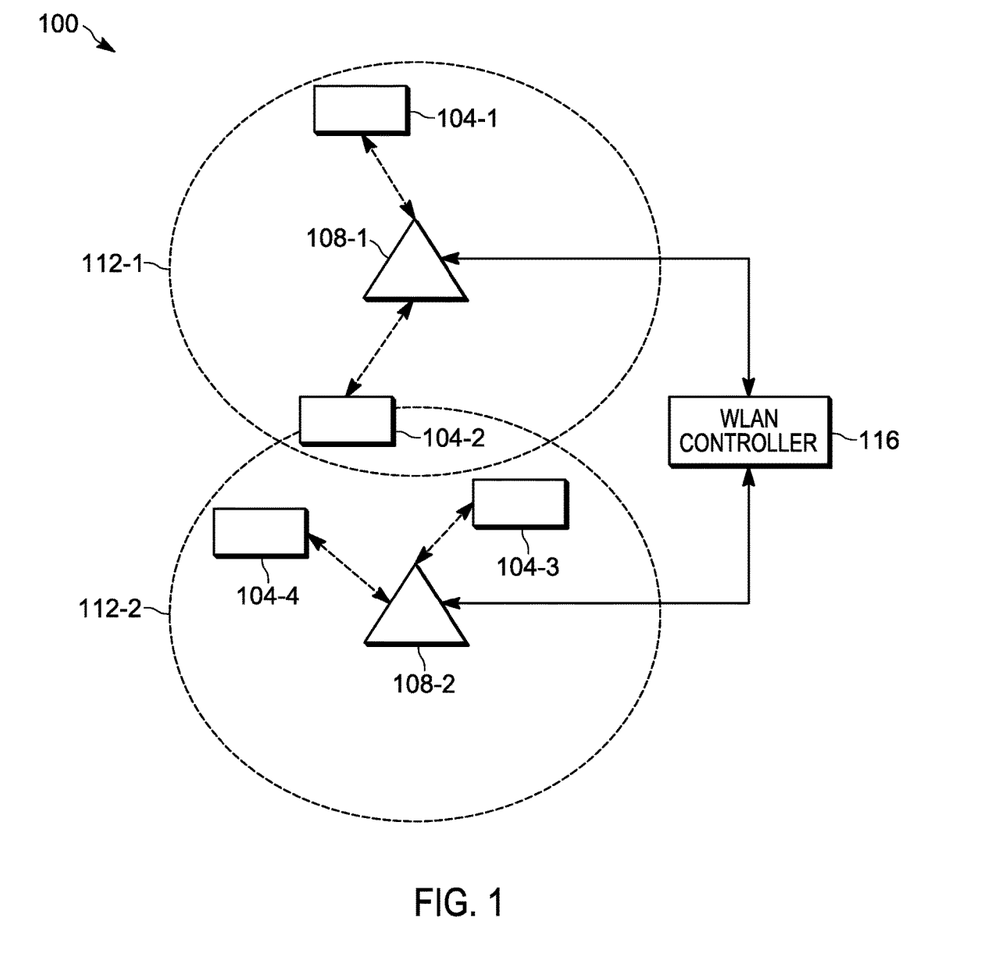
FIG. 1 is a schematic diagram of a communications system.

FIG. 1 depicts a communication system 100 including a plurality of wireless client computing devices, of which four examples 104-1, 104-2, 104-3 and 104-4 (collectively referred to as the wireless client computing devices 104, and generically referred to as a wireless client computing device 104) are shown. The system 100 also includes a wireless network, such as a wireless local area network (WLAN) implemented by one or more access points, of which two examples 108-1 and 108-2 are shown, each providing an area of coverage 112-1, 112-2 within which the devices 104 may establish wireless connections with the access points 108 (e.g. according to a suitable member of the IEEE 802.11 family of communication standards).

The access points 108, in turn, can be connected to a WLAN controller 116, which in turn may be connected to a wide-area network (WAN, not shown) such as the Internet. The system 100 can be deployed in a variety of environments, including for example a warehouse, production facility or the like. The client devices 104 may be barcode scanners, smartphones, tablet computers, label printers, or the like. The client devices 104 may therefore be configured to travel the facility and exchange data with a server (not shown, e.g. connected to the WLAN controller 116) via the WLAN implemented by the access points 108. While moving in the facility, each device 104 may leave the area of coverage 112 of one access point (e.g. the access point 108-2) and enter the area of coverage 112 of another access point (e.g. the access point 108-1). As will be apparent to those skilled in the art, the client devices 104 are configured in such situations to maintain a substantially consistent connection with the WLAN by roaming from one access point 108 to another.

The client devices 104 are also configured, as will be understood by those skilled in the art, to re-establish wireless connections with the access points 108 in the event that such connections are lost. Various conditions can cause loss of connectivity at a given client device 104. For example, structural obstructions (e.g. walls, metal shelving, and the like) may form areas in the facility with poor connectivity. Various conditions at the client devices 104 themselves (e.g.

low battery, software or hardware failures, and the like) may also cause loss of connectivity.

Further, an outage suffered by the WLAN infrastructure itself can cause the client devices 104 to lose their connections with the access points 108. For example, a given access point 108 may suffer an outage resulting from a reboot. As a further example, a power outage in the facility may result in the access points 108 and the WLAN controller 116 suffering an outage. WLAN infrastructure outages in the system 100 result in the loss of connections between the client devices 104 and the WLAN. As noted above, because the client devices 104 are configured to re-establish connectivity whenever connectivity is lost, WLAN infrastructure outages may result in a substantial portion (up to and including all) of the client devices 104 attempting to re-establish connectivity with the access points 108 simultaneously. Such a sudden increase in load on the access points, the WLAN controller 116, or both, may cause network congestion or a further outage. The client devices 104 are therefore also configured, as discussed below in greater detail, to perform certain actions to reduce the impact of client connection attempts on network infrastructure.

Figure 2A:
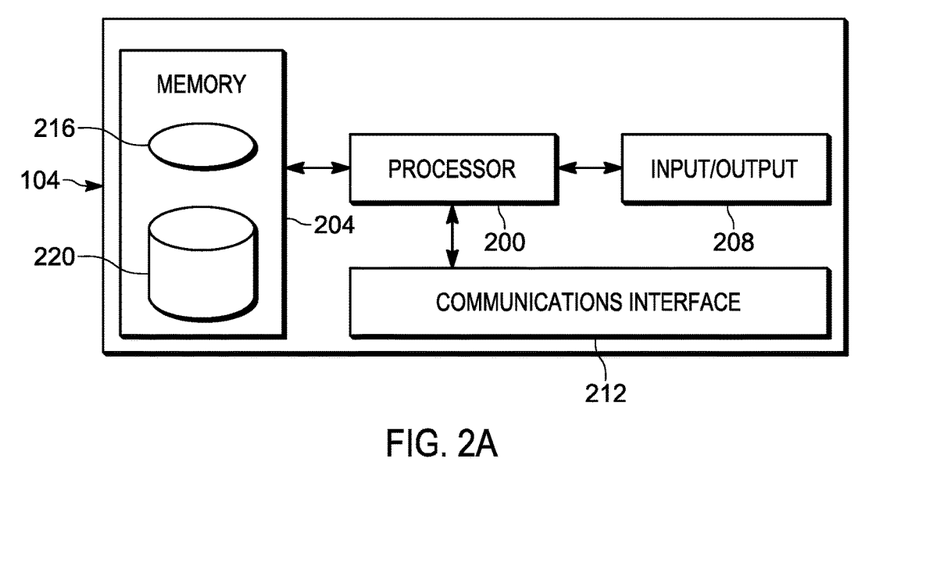
FIG. 2A is a block diagram of certain internal hardware components of a client device of FIG. 1.

Turning to FIG. 2A, certain internal components of a client device 104 are illustrated. Each of the client devices 104 in the system 100 include the components shown in FIG. 2A, although the client devices 104 may have heterogeneous form factors and implementations of the components shown.

The device 104 includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes at least one input device, and at least one output device, illustrated in FIG. 2A as an input/output device 208 interconnected with the processor 200. The input device includes any suitable one, or any suitable combination of, a touch screen, a keypad, a trigger (e.g. to initiate the performance of any encoding task), and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 212, enabling the device 104 to exchange data with other computing devices, such as the access points 108. The communications interface 212 includes any suitable hardware (e.g. transmitters, receivers, network interface controllers and the like) allowing the device 104 to communicate, e.g. over the WLAN.

The components of the device 104 are interconnected by communication buses (not shown), and powered by a battery or other power source, over the above-mentioned communication buses or by distinct power buses (not shown).

The memory 204 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a communication control application 216, also referred to herein as the application 216. The device 104 is configured, via execution of the application 216 by the processor 200, to monitor WLAN disconnection events and, under certain conditions, to alter the behavior of the device 104 when establishing connections with the access points 108. To that end, the memory 204 also stores a log 220 of disconnection events. As will be discussed below, the disconnection events represented in the log 220 include local disconnection events occurring at the device 104, as well as remote disconnection events occurring at other devices 104 and detected by the device 104 via a notification mechanism discussed below.

In other examples, the processor 200, as configured by the execution of the application 216, is implemented as one or more specifically-configured hardware elements, such as field-programmable gate arrays (FPGAs) and/or application-specific integrated circuits (ASICs).

Figure 2B:
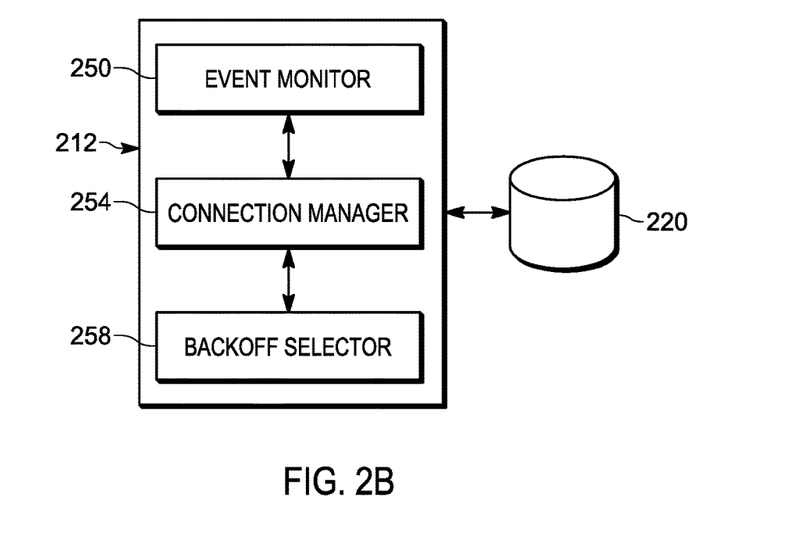
FIG. 2B is a block diagram of certain internal components of the client device of FIG. 2A.

Turning to FIG. 2B, certain components of the application 216 are illustrated. In other embodiments, the components of the application 216 may be implemented as a plurality of distinct applications executed by the processor 200. In further examples, one or more of the components of the application 216 shown in FIG. 2B can be implemented as specifically configured hardware elements, rather than as computer-readable instructions for execution by the processor 200. For example, one or more of the components shown in FIG. 2B can be implemented as an FPGA, and ASIC, or the like.

The application 216 includes an event monitor 250 configured to track disconnection events detected at the device 104 and store the disconnection events in the log 220. The application 216 also includes a connection manager 254 configured to control the communications interface 212 to establish and maintain connections with the access points 108. As will be discussed below, the connection manager 254 is configured to perform the above functions based in part on information obtained from the event monitor 250, as well as from a backoff selector 258. The backoff selector 258 is configured, under certain conditions, to select a backoff interval to delay connection initiations by the connection manager 254. In general, the components of the application 216 are configured to increment a default connection interval employed by the connection manager 254 by a backoff interval under certain conditions, to reduce the potential negative impact on the WLAN infrastructure of simultaneous reconnection attempts by substantial numbers of the devices 104.

Figure 3:
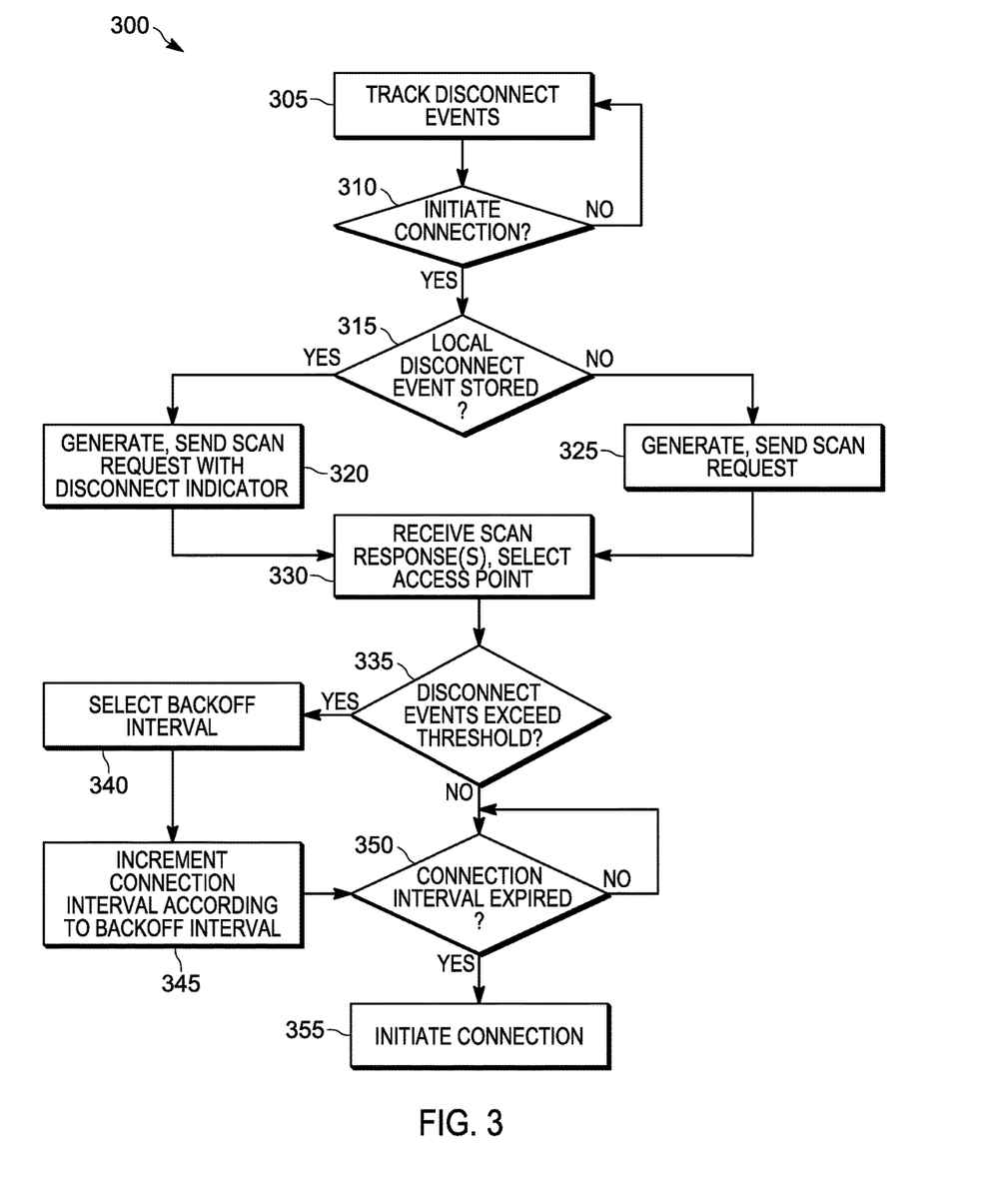
FIG. 3 is a flowchart of a method of mitigating connection impact on network infrastructure in the system of FIG. 1.

Turning now to FIG. 3, a method 300 of mitigating connection impact on network infrastructure is illustrated. The method 300 will be described in conjunction with its performance on the system 100. More specifically, the method 300 as described below is performed by the devices 104 in the system 100, with reference to the components of each device 104 as illustrated in FIGS. 2A and 2B. As will be apparent in the discussion below, each device 104 may perform a separate instance of the method 300.

Beginning at block 305, each device 104 (specifically, each event monitor 250) is configured to track disconnection events via the log 220. A disconnection event indicates a loss of a previously established connection with an access point 108 by a device 104. That is, a disconnection event may occur in response to an outage suffered by the access point 108, physical interference in the environment in which the devices 104 are deployed, or the like. In some embodiments, disconnection events may also be initiated by the devices 104, for example to roam from one access point 108 to another. In such embodiments, the log 220 includes indicators to distinguish between disconnection events initiated by the devices 104 and disconnection events caused by conditions external to the devices 104.

Each device 104 is configured to track disconnection events occurring locally (i.e. within the device 104), as well as disconnection events occurring remotely (i.e. at other devices 104). Before continuing with the performance of the method 300, the tracking of disconnection events will be described in greater detail with reference to FIG. 4.

Figure 4:
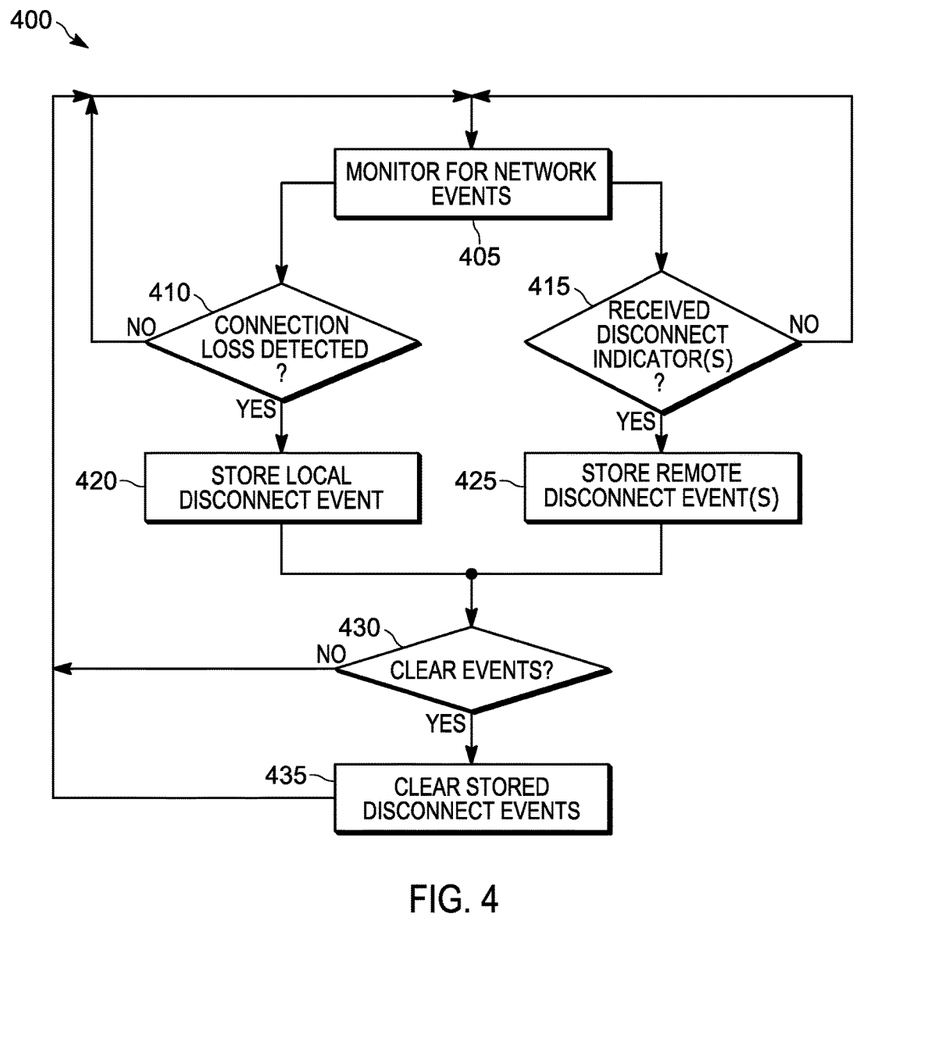
FIG. 4 is a method of tracking disconnection events in the method of FIG. 3.

Turning to FIG. 4, a method 400 of tracking disconnection events (i.e. of performing block 305) is illustrated. At block 405, the event monitor 250 is configured to monitor network events. For example, the event monitor 250 can be configured to monitor status data generated by the communications interface 212 reflecting events detected internally at the communications interface 212 and messages received from other devices 104 at the communications interface 212. The event monitor 250, in particular, is configured to monitor for connection losses at the device 104 itself, and for connection losses signaled by other devices 104, via the performance of blocks 410 and 415, respectively.

Figure 5:
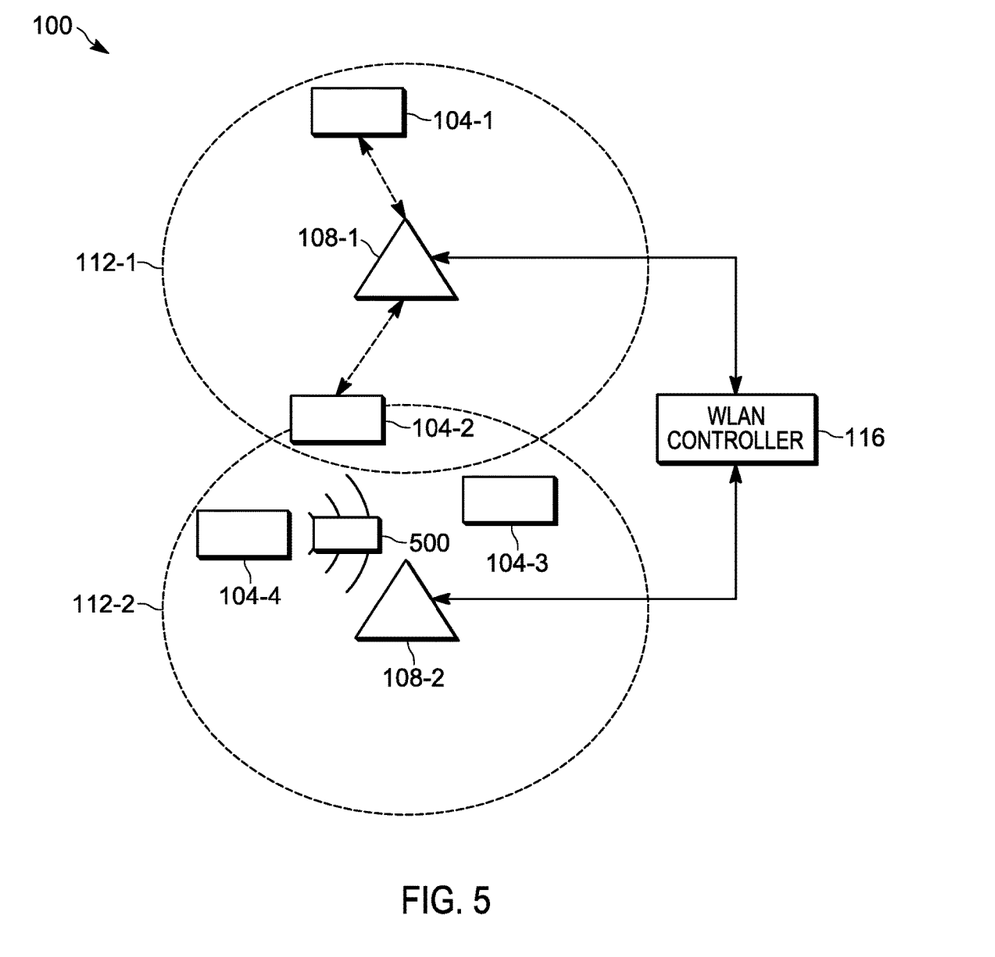
FIG. 5 depicts the system of FIG. 1 following an access point outage.

At block 410, the event monitor 250 is configured to determine whether a connection loss has been detected by the communications interface 212. That is, the event monitor 250 is configured to determine whether the communications interface 212 has detected the loss of a connection previously established between the communications interface 212 itself and an access point 108. Turning to FIG. 5, the system 100 is shown in an updated state, in which the access point 108-2 has suffered an outage. It is assumed that the access point 108-2 has regained an operational state in FIG. 5 following the outage, but that no connections have yet been re-established. As a result, the connections between the access point 108-2 and each of the devices 104-3 and 104-4 have been lost. The event monitor 250 of the device 104-3, therefore, determines at block 410 that a connection loss has been detected and proceeds to block 420, at which a local disconnection event is stored in the log 220.

Still referring to FIG. 5, the device 104-4, responsive to the loss of the connection with the access point 108-2, also stores a local disconnection event (via the performance of blocks 405 and 410). Further, via a mechanism to be discussed below in connection with the method 300, the device 104-4 begins the process of reconnecting to the WLAN infrastructure via the transmission of a scanning request message 500 such as a probe request. The message 500 includes an indication that the device 104-4 has detected a local disconnection event.

The scanning request message 500, as will be apparent to those skilled in the art, causes any access points (such as the access point 108-2) receiving the message 500 to respond to the device 104-4 with scanning response messages (e.g. probe responses) containing information for use in establishing a connection between the device 104-4 and the access point 108. The message 500 is also received, however, at the device 104-3, which is configured to detect specific information contained within the message 500, as will be discussed below.

Returning to FIG. 4, based on the content of the message 500, the device 104-3 is also configured to determine, at block 415, that a remote disconnection event has been detected. Specifically, the message 500 indicates that the device 104-4 lost a connection with the access point 108-2. The performance of the method 400 thus proceeds to block 425, at which the event monitor 250 of the device 104-3 is configured to store a remote disconnection event in the log 220. Following the above performances of blocks 420 and 425, the log 220 of the device 104-3 therefore includes one local disconnection event and one remote disconnection event. The disconnection events may be stored, for example, in respective records in the log 220, each including a device identifier that indicates whether the event represents a local or remote disconnection event. Each disconnection event is typically stored with a timestamp corresponding to the time when the disconnection event was detected. Table 1, below, illustrates example disconnection event records stored in the log 220 of the device 104-3 after the performance of blocks 420 and 425.

TABLE 1

| Log 220 of Disconnection Events at Device 104-3 | |
| --- | --- |
| Timestamp | Device ID |
| $T_1$ | 104-3 |
| $T_2$ | 104-4 |

As seen above, the log 220 of the device 104-3 includes a local disconnection event (the first row), and a remote disconnection event (the second row). As will be discussed in greater detail below, additional events may also be stored in the log 220, such as roaming events or new connection (e.g. following power-on) initiated by the devices 104. Such events may be distinguished from the events mentioned above resulting from infrastructure outages.

Tables 2 and 3 below indicate the results of performing the method 400 at each of the devices 104-2 and 104-4 under the conditions shown in FIG. 5.

TABLE 2

| Log 220 of Disconnection Events at Device 104-2 | |
| --- | --- |
| Timestamp | Device ID |
| $T_1$ | 104-3 |
| $T_2$ | 104-4 |

TABLE 3

| Log 220 of Disconnection Events at Device 104-4 | |
| --- | --- |
| Timestamp | Device ID |
| $T_1$ | 104-3 |
| $T_2$ | 104-4 |

As seen above, the same disconnection events are stored in each log 220 of the devices 104-2, 104-3 and 104-4. Specifically, the device 104-2 receives the message 500 from the device 104-4 and a similar message (not shown) from the device 104-3, and thus stores two indications of remote disconnection events. The device 104-4, meanwhile, stores a local disconnection event corresponding to the loss of the connection between the device 104-4 and the access point 108-2, as well as a remote disconnection event resulting from receipt of a message emitted by the device 104-3 similar to the message 500.

At block 430, the event monitor 250 is configured to determine whether to clear any events from the log 220. For example, the event monitor 250 can be configured to clear any event from the log with an age greater than a preconfigured threshold (e.g. twenty seconds). In other examples, the event monitor 250 can be configured to clear the entire contents of the log 220 at preconfigured intervals. In further examples, the event monitor 250 can be configured to clear the entire contents of the log 220 when a connection is successfully established with an access point 108.

When the determination at block 430 is negative, the event monitor 250 is configured to continue monitoring for network events at block 405. When the determination at block 430 is affirmative, the event monitor 250 is configured to clear one or more of the records from the log 220, and return to block 405.

Returning to FIG. 3, as will now be apparent, each device 104 includes a log of local and remote disconnection events via the performance of the method 400. At block 310, the device 104 (and particularly, the connection manager 254) is configured to determine whether to initiate a connection. When a connection with an access point 108 was lost, the devices 104 are typically configured to attempt to re-establish a connection, and the determination at block 310 is therefore affirmative. The determination at block 310 may also be a determination to seek an access point to roam to, for a device 104 that is already connected to an access point 108. Such a determination may, for example, be based on a received signal strength indicator (RSSI) generated by the communications interface 212—if the RSSI drops below a preconfigured threshold, the device 104 may be configured to begin seeking further access points 108.

When the determination at block 310 is negative, the device 104 simply continues to track disconnection events. Following an affirmative determination at block 310, however, performance of the method 300 proceeds to block 315. At block 315, the device 104 is configured to determine whether the log 220 contains a record representing a local disconnection event. Taking the device 104-3, for example, at block 315 the determination is affirmative because Table 1 contains a local disconnection event (i.e. an event bearing the identifier of the device 104-3). The device 104-2, in contrast, makes a negative determination at block 315, because Table 2 does not contain a local disconnection event (rather, both events in Table 2 are remote disconnection events).

Following an affirmative determination at block 315, performance of the method 300 proceeds to block 320. At block 320, the connection manager 254 is configured to control the communications interface 212 to generate and send a scanning request message, such as a probe request, containing a disconnection indicator. As will now be apparent to those skilled in the art, the message 500 discussed above is an example of such a scanning request message containing a disconnection indicator. The disconnection indicator can take a variety of forms. For example, the disconnection indicator can be implemented as an information element (IE) in a probe request frame. The information element may, for example, include a field name identifying the element as a disconnection indicator, and a value indicating whether or not a local disconnection event has been detected by the sender of the probe request frame. The value can be a binary value in some examples, with a "1" indicating detection of a local disconnection event and "0" indicating no detection of a local disconnection event. In other embodiments, other strings, including text strings, may be employed as values for the IE.

When the determination at block 315 is negative, performance of the method 300 proceeds to block 325, at which the connection manager 254 is configured to control the communications interface 212 to generate and send a scanning request message, such as a probe request, that does not include a disconnection indicator. The message generated at block 325 can simply omit the above-mentioned information element. In other embodiments, the message generated at block 325 includes the information element, but the value assigned to the information element indicates that no local disconnection event has been detected. For example, the device 104-2 (which is connected to the access point 108-1) may send such a message at block 325 following a determination at block 310 to initiate a roaming procedure.

The transmission of messages at blocks 320 and 325, as will now be apparent to those skilled in the art, may result in updates to the logs 220 of devices receiving the messages. For example, as described above, the transmission of the message 500 by the device 104-4 (i.e. via the performance of block 320) results in the devices 104-2 and 104-3 updating their respective logs 220.

At block 330, the connection manager 254 is configured to receive responses to the message sent at block 320 or 325 from one or more access points. The responses may be, for example, probe response messages containing various information elements for use in subsequently establishing a connection between the device 104 and the access point 108. When more than one response is received (i.e. from more than one access point 108), the connection manager 254 is configured to select an access point with which to initiate a connection. Before initiating the connection, however, the connection manager 254 is configured to determine, at block 335, whether the disconnection events stored in the log 220 exceed a preconfigured threshold.

The determination at block 335 can include a determination of whether the number of disconnection events (whether local or remote) in the log 220 is greater than a threshold. In other examples, the devices 104 are configured to store records for disconnection events as discussed above, as well as records that correspond to roaming events, such as the "0" values included in messages sent at block 325. In such embodiments, the determination at block 335 involves a determination of whether the proportion of disconnection events to non-disconnection events exceeds a preconfigured threshold (e.g. 60%). Table 4 illustrates the log 220 of the device 104-3 in embodiments in which not only disconnection events (resulting from local detections or receipt of messages sent at block 320) but also non-disconnection events (resulting from the receipt of messages sent at block 325) are stored.

TABLE 4

Log 220 of Disconnection Events at Device 104-3

| Timestamp | Device ID | Disconnect Value |
|---|---|---|
| $T_1$ | 104-3 | 1 |
| $T_2$ | 104-4 | 1 |
| $T_3$ | 104-2 | 0 |

As seen above, a third record in the log 220 corresponds to a scanning request message sent by the device 104-2 and received by the device 104-3, and containing the above-mentioned disconnection indicator with a value of "0" (or other suitable value) indicating that no local disconnection event has been detected at the device 104-2. At block 335, the device 104-3 can be configured to determine the ratio of disconnection events to non-disconnection events in the log 220 (66.7% in the example of Table 4) and to compare the ratio to a threshold.

When the determination at block 335 is affirmative, the backoff selector 258 is configured to select a backoff interval at block 340, according to a selection mechanism to be discussed below in greater detail. At block 345, the connection manager 254 is configured to increment a default connection interval (which may be, for example, 100 milliseconds) by the selected backoff interval. At block 350, the connection manager 254 is configured to determine whether the connection interval has expired. When the determination at block 350 is affirmative, at block 355 the connection manager 254 is configured to initiate a connection with the access point 108 selected at block 330, for example by sending a connection request message (e.g. an association request frame) to the access point 108. When the determination at block 350 is negative, the connection manager 254 is configured to wait for the connection interval to expire.

As will be apparent, when the determination at block 335 is negative, the connection manager 254 proceeds directly to block 350 without selection of a backoff interval. The connection interval is therefore not incremented from the default. In some embodiments, the default connection interval may be omitted (i.e. may be zero) and a negative determination at block 335 therefore results in initiating the connection at block 355 substantially immediately.

The selection of a backoff interval at block 340 is configured to delay the initiation of the connection at block 355 sufficiently to mitigate the potential impact of multiple simultaneous connection requests arriving at the same access point 108. In other words, the selection and application of a backoff interval by each device 104 serves to spread out reconnection attempts by the devices 104 responsive to an infrastructure outage.

Various mechanisms are contemplated for selecting backoff intervals. In some examples, the backoff selector 258 of each device 104 is configured to perform block 340 by selecting one of a plurality of predefined backoff slots. For example, each device 104 can store, in the memory 204, an indication of a plurality of backoff slots and an indication of the length of each slot. For example, twenty slots spaced apart by one second may be stored, although both greater and smaller numbers of slots and longer or shorter spacing between slots may be employed in other embodiments.

At block 340, in such embodiments, the backoff selector 258 can be configured to select one of the above-mentioned slots, for example at random (e.g. employing a portion of the device media access control (MAC) address as a seed).

Figure 6:
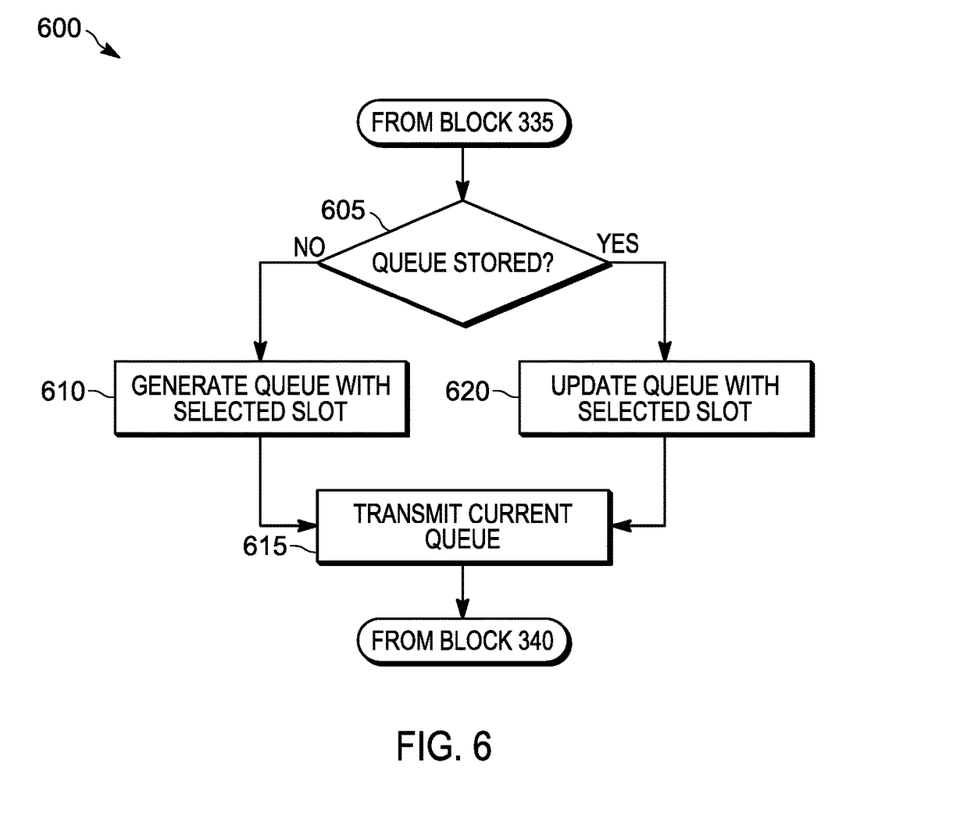
FIG. 6 is a flowchart of a method of selecting a backoff interval in the method of FIG. 3.

In other embodiments, turning to FIG. 6, the devices 104 are configured to manage a connection queue specifying backoff intervals for each device according to a method 600. Specifically, at block 605, the backoff selector 258 is configured to determine whether a queue is stored in the memory 204. When the determination is negative, the backoff selector 258 is configured at block 610 to generate a queue containing a predefined set of slots, such as the set noted earlier. The backoff selector 258 is also configured to select one of the slots (e.g. the first available slot, or a slot based on the MAC address of the device 104). The backoff selector 258 is then configured to transmit the queue at block 615, for example in another scanning request message (e.g. a probe request frame including one or more additional information elements for queue information), for receipt by the other devices 104.

When the determination at block 605 is affirmative (e.g. when the determination at block 605 occurs following receipt of a scanning request message containing a queue), the backoff selector 258 instead proceeds to block 620 and generates an updated queue containing any slot previous assignments, along with a slot assignment selected by the backoff selector 258. The updated queue is then transmitted at block 615. Thus, via the exchange of queue information contained in scanning request messages, any devices 104 seeking to initiate a connection with the WLAN infrastructure (when the WLAN infrastructure is likely to have suffered a recent outage as indicated by the determination at block 335) may negotiate connection slots to mitigate the impact of their connection attempts.

Variations to the above methods and systems are contemplated. For example, additional values may be included in the disconnection indicator field, beyond an indication of a local disconnection and an indication of a roaming event. For example, a distinct value (e.g. "2") may be employed to indicate that the device 104 sending a scanning request message has recently powered on and is seeking to establish a connection. At block 335, the determination may include not only a determination of whether a sufficient number of disconnection events are represented in the log 220, but also a determination of whether a number of new connection initiations are represented in the log 220 that exceeds a threshold. A high number of new connection initiations may indicate the changing of shifts in a facility and associated staging of devices coming on-shift, which can result in significant load on the WLAN infrastructure, even in the infrastructure has not suffered an outage. The new connection initiations, together with the disconnection events discussed earlier, may be collectively referred to as impact events, with the indicator contained in the scanning request messages defining whether a given scanning request message reports a disconnection event or a new connection initiation. The indicator in the scanning request messages may therefore also be referred to more generally as an impact indicator.

In further examples, the logs 220 need not be formatted as discussed above. For example, separate logs may be maintained for local and remote disconnection events. Further, device identifiers need not be stored with the events. Instead, for example, an event type indicator can be included in each record indicating whether the record corresponds to a local event or a remote event.

In still further examples, the devices 104 and the access points 108 can be configured to perform additional actions to mitigate the impact of simultaneous connections by devices 104 that are not within range of each other's transmissions (i.e. "hidden nodes"). For example, turning to FIG. 7, the system 100 is shown following an outage of both access points 108-1 and 108-2. As a result, every device 104 has lost its connection with the access points 108. However, the device 104-1 may not be within transmission range of the other devices 104 (e.g. due to physical distance, intervening physical obstacles, or the like). As a result, the device 104-1 may not receive the message 500 mentioned earlier, and the other devices 104 may not receive such messages sent by the device 104-1.

Figure 7:
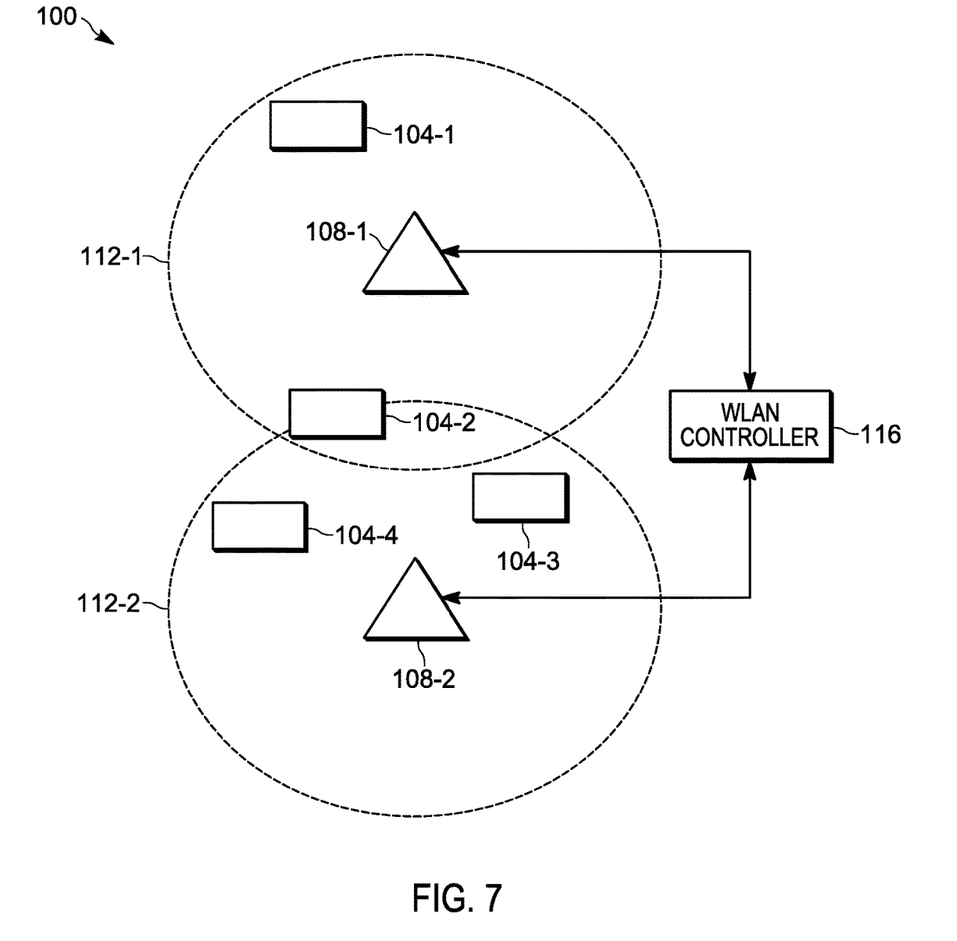
FIG. 7 depicts the system of FIG. 1 following access point outages.

The access point 108 can be configured, in some embodiments, to include the disconnection information element received in scanning requests in the scanning responses generated by the access point 108. The device 104-1 may therefore receive (at blocks 405 and 415) indications of remote disconnection events when the devices reporting those remote disconnection events are out of range of the device 104-1.

Further, each device 104 may be configured, upon receiving a message indicating establishment of a connection between another device 104 and an access point 108, to select a backoff interval even in the absence of other disconnect detections at the device 104 (e.g., when the determination at block 335 is negative). Thus, the device 104-1 may not receive the message 500, but may receive a subsequent message, such as an association response generated by the access point 108-1 following reconnection of the device 104-2. The receipt of the association response from the access point 108-1, that is directed to other devices 104 not detected by the device 104-1 (e.g., when the probe requests and association requests from such devices 104 were not previously detected by the device 104-1), indicates to the device 104-1 that other devices 104 are also in the process of connecting to the access point 108-2, and the device 104-1 may therefore select a backoff interval before initiating a connection with the access point 108-2. In some embodiments, the client devices 104 are configured to select a backoff interval under the above conditions only when the number of probe request messages detected that originate from other devices 104 is below a threshold (e.g., when no such probe messages have been detected).

In further embodiments, the devices 104 can be configured, once a connection has been established with an access point 108, to broadcast the queue generated or updated by performing the method 600, via the access point 108. The transmission range of the access points 108 is typically greater than the transmission range of the devices 104, and broadcasting the queue via an access point 108 may therefore permit the queue to reach devices (such as the device 104-1) that otherwise would not receive the queue.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a client device of mitigating connection impact on network infrastructure, comprising:

storing a record of network impact events;
prior to initiating a network connection, determining whether the record of network impact events contains an indication of a local impact event;
when the record of network impact events contains an indication of a local impact event, generating and transmitting a scanning request message containing an impact indicator;
responsive to receiving a response to the scanning request message, determining whether a number of entries in the record of network impact events exceeds a threshold;
when the number of entries in the record of network impact events exceeds the threshold, incrementing a connection interval according to a backoff interval; and
sending a connection request message upon expiry of the connection interval,
wherein the network impact events include network disconnection events and storing the record of network impact events includes:
responsive to detecting loss of a connection between the client device and the network infrastructure, storing a local disconnection event, and
responsive to receiving an impact indicator indicating a network disconnection event from another client device, storing a remote disconnection event.

2. The method of claim 1, further comprising:
responsive to receiving impact indicators indicating network disconnection events from each of a plurality of other client devices, storing respective distinct remote disconnection events.

3. The method of claim 1, wherein the network impact events include new connection initiations.

4. The method of claim 1, wherein the scanning request message is a probe request.

5. The method of claim 1, wherein the connection request message is an association request.

6. The method of claim 1, further comprising selecting the backoff interval by:
retrieving a client identifier from a memory of the client device; and
selecting one of a plurality of predefined backoff intervals based on the client identifier.

7. The method of claim 1, further comprising selecting the backoff interval by:
determining whether a first connection queue has been received at the client device;
when the first connection queue has not been received:
selecting a first backoff interval of a plurality of predefined backoff intervals;
generating a second connection queue containing the plurality of backoff intervals and an indication that the first backoff interval has been selected; and
transmitting a message containing the second connection queue and an indication of the selected first backoff interval.

8. The method of claim 7, wherein the message containing the second connection queue is the connection request.

9. The method of claim 7, further comprising:
when the first connection queue has been received:
retrieving the first connection queue from a memory of the client device;
selecting a next available one of the plurality of predefined backoff intervals;
generating an updated queue containing an indication that the next available backoff interval has been selected; and
transmitting a message containing the updated queue.

10. The method of claim 7, further comprising:
responsive to establishing the network connection with an access point via the connection request message, instructing the access point to broadcast the second queue.

11. The method of claim 1, further comprising, when the number of entries in the record of network impact events does not exceed the threshold:
responsive to detecting a connection response message from an access point addressed to another client device, incrementing the connection interval according to the backoff interval.

12. A client device for mitigating connection impact on network infrastructure, comprising:
a communications interface;
a memory storing a record of network impact events;
a processor interconnected with the memory and the communication interface, the processor configured to:
prior to initiating a network connection, determine whether the record of network impact events contains an indication of a local impact event;
when the record of network impact events contains an indication of a local impact event, generate and transmit a scanning request message containing an impact indicator;
responsive to receiving a response to the scanning request message, determine whether a number of entries in the record of network impact events exceeds a threshold;
when the number of entries in the record of network impact events exceeds the threshold, increment a connection interval according to a backoff interval; and
send a connection request message upon expiry of the connection interval,
wherein the network impact events include network disconnection events and the processor is further configured to:
responsive to detecting loss of a connection between the client device and the network infrastructure, store a local disconnection event in the memory, and
responsive to receiving a disconnect indicator from another client device, store a remote disconnection event in the memory.

13. The client device of claim 12, wherein the processor is further configured to:
responsive to receiving disconnect indicators from each of a plurality of other client devices, store respective distinct remote disconnection events in the memory.

14. The client device of claim 12, wherein the network impact events include new connection initiations.

15. The client device of claim 12, wherein the scanning request message is a probe request.

16. The client device of claim 12, wherein the connection request message is an association request.

17. The client device of claim 12, wherein the processor is further configured to: select the backoff interval by:
retrieving a client identifier from the memory; and
selecting one of a plurality of predefined backoff intervals based on the client identifier.

18. The client device of claim 12, wherein the processor is further configured to select the backoff interval by:

determining whether a first connection queue has been received at the client device;

when the first connection queue has not been received:
    selecting a first backoff interval of a plurality of predefined backoff intervals;
    generating a second connection queue containing the plurality of backoff intervals and an indication that the first backoff interval has been selected; and
    transmitting a message containing the second connection queue and an indication of the selected first backoff interval.

19. The client device of claim 18, wherein the message containing the second connection queue is the connection request.

20. The client device of claim 18, wherein the processor is further configured to:

when the first connection queue has been received:
    retrieving the first connection queue from a memory of the client device;
    selecting a next available one of the plurality of predefined backoff intervals;
    generating an updated queue containing an indication that the next available backoff interval has been selected; and
    transmitting a message containing the updated queue.

21. The client device of claim 18, the processor further configured to:
    responsive to establishing the network connection with an access point via the connection request message, instruct the access point to broadcast the second queue.

22. The client device of claim 12, the processor further configured to, when the number of entries in the record of network impact events does not exceed the threshold:
    responsive to detecting a connection response message from an access point addressed to another client device, increment the connection interval according to the backoff interval.

23. A method in a client device of mitigating connection impact on network infrastructure, comprising:
    storing a record of network impact events;
    prior to initiating a network connection, determining whether the record of network impact events contains an indication of a local impact event;
    when the record of network impact events contains an indication of a local impact event, generating and transmitting a scanning request message containing an impact indicator;
    responsive to receiving a response to the scanning request message, determining whether a number of entries in the record of network impact events exceeds a threshold;
    when the number of entries in the record of network impact events exceeds the threshold, incrementing a connection interval according to a backoff interval; and
    sending a connection request message upon expiry of the connection interval,
        wherein when the number of entries in the record of network impact events does not exceed the threshold:
        responsive to detecting a connection response message from an access point addressed to another client device, incrementing the connection interval according to the backoff interval.

24. A method in a client device of mitigating connection impact on network infrastructure, comprising:
    storing a record of network impact events;
    prior to initiating a network connection, determining whether the record of network impact events contains an indication of a local impact event;
    when the record of network impact events contains an indication of a local impact event, generating and transmitting a scanning request message containing an impact indicator;
    responsive to receiving a response to the scanning request message, determining whether a number of entries in the record of network impact events exceeds a threshold;
    when the number of entries in the record of network impact events exceeds the threshold, incrementing a connection interval according to a backoff interval; and
    sending a connection request message upon expiry of the connection interval,
        wherein the network impact events include network disconnection events and the method further comprises, responsive to receiving impact indicators indicating network disconnection events from each of a plurality of other client devices, storing respective distinct remote disconnection events.

\* \* \* \* \*